United States Patent
Chougule et al.

(10) Patent No.: US 10,614,093 B2
(45) Date of Patent: Apr. 7, 2020

(54) METHOD AND SYSTEM FOR CREATING AN INSTANCE MODEL

(71) Applicant: Tata Consultancy Services Limited, Mumbai (IN)

(72) Inventors: Sandeep Chougule, Pune (IN); Amrish Shashikant Pathak, Pune (IN); Sharmishtha Prakash Kulkarni, Pune (IN); Nikita Aggarwal, Pune (IN); Manish Kailash Khandelwal, Pune (IN); Rahul Ramesh Kelkar, Pune (IN); Harrick Mayank Vin, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 294 days.

(21) Appl. No.: 15/833,479

(22) Filed: Dec. 6, 2017

(65) Prior Publication Data
US 2018/0157723 A1 Jun. 7, 2018

(30) Foreign Application Priority Data
Dec. 7, 2016 (IN) .............................. 201621041869

(51) Int. Cl.
*G06F 16/25* (2019.01)
*G06F 16/28* (2019.01)

(52) U.S. Cl.
CPC .......... *G06F 16/254* (2019.01); *G06F 16/288* (2019.01)

(58) Field of Classification Search
CPC .............................. G06F 16/254; G06F 16/288
USPC ....................................................... 707/602
See application file for complete search history.

(56) References Cited

U.S. PATENT DOCUMENTS

| 7,281,018 B1 * | 10/2007 | Begun ................... G06F 17/218 |
| 9,256,668 B2 | 2/2016 | Raichelgauz et al. |
| 2003/0004971 A1 * | 1/2003 | Gong ................... G06Q 10/087 |
| 2006/0026203 A1 * | 2/2006 | Tan ........................ G06F 17/277 |

(Continued)

FOREIGN PATENT DOCUMENTS

| WO | WO-1992/009034 | 5/1992 |
| WO | WO-2015/036817 | 3/2015 |

OTHER PUBLICATIONS

Boyd, Michael, et al., "AutoMed: A BAV Data Integration System for Heterogeneous Data Sources", CAiSE 2004, LNCS 3084, Springer-Verlag, Berlin, Germany, © 2004, pp. 82-97.*

*Primary Examiner* — Robert Stevens
(74) *Attorney, Agent, or Firm* — Finnegan, Henderson, Farabow, Garrett & Dunner LLP (57) ABSTRACT

A system and method for creating an instance model is provided. The system provides an information extraction and modeling framework from wide spectrum of document types such as PDF, Text, HTML, LOG, CSV, images, audio/video files and DOCX. In this framework information is extracted and mapped on a domain conceptual model like ER model and the instance model is created. Initially a template model is created using the existing ER model and the plurality of data sources. The template model, the existing ER model and the information extracted from the plurality of data sources are then provided as input to generate the instance model. The system or method is not limited to extract information from log files. This can be useful for different types of files type if the structures and formats of data are different. The system can also be used with unstructured type of data sources.

15 Claims, 6 Drawing Sheets

(56) References Cited

U.S. PATENT DOCUMENTS

2009/0006448 A1* 1/2009 Pall .................... G06F 16/83
2014/0075557 A1   3/2014 Balabine et al.
2018/0032316 A1* 2/2018 Dinga .................. G06F 8/33

* cited by examiner

METHOD AND SYSTEM FOR CREATING AN INSTANCE MODEL

CROSS-REFERENCE TO RELATED APPLICATIONS AND PRIORITY

The present application claims priority from Indian provisional specification no. 201621041869 filed on 7 Dec. 2016, the complete disclosure of which, in its entirety is herein incorporated by references.

TECHNICAL FIELD

The embodiments herein generally relate to the field of knowledge acquisition and knowledge representation and reasoning, and, more particularly, method and system for instance model generation using an existing entity relationship (ER) model and template model using an extract, transform, load (ETL) process.

BACKGROUND

Meta-modeling environments allow modelers to simulate complex scenarios with high-level modeling tools. Meta-modeling environments provide the user with the basic tools with which the user can create a meta-model. The user-defined meta-model, which may also be referred to as an ontology, can then be processed by the meta-modeling environment to generate an interface that can be used to create one or more instance models. Often, meta-modeling environments provide a visual language, allowing modelers to create detailed models, without requiring low-level knowledge of the underlying classes that make up the model.

Existing meta-modeling environments typically may be used to create domain-specific modeling tools. Meta-models include syntax, semantics and entities. Entities such as routers, switches, operating systems, VMs, Servers continuously generate vast amount of logs data per second. This data contain useful information which can be used to take automatic action if machine can understand it. Automation tools can perform troubleshooting, security check if this unstructured information can be converted into structured format. The input information such as log files or any other data sources can be straightforward or obscure, depending on the attitude of the developer who wrote them. Either way, most of the time they are written with human readers in mind. It is necessary to extract relevant information from the data.

Information extraction is task to extract domain specific relevant information from different data sources. Extracted information can be domain entities, association between entities, attributes like hostname, port number, data etc. and associated verbs with each entity. Extracting information can be from logs, html files, pdf files, domain corpus, webs and scanned images of forms. The extraction of data from speech data and other data sources is also addressed.

In the existing solutions, a generic unified approach is missing for creating instance of a model for infrastructure, forms, invoice, purchase orders, goods received notes, clinical trials, processes etc. and associating them with existing instance models to do analysis especially in the field of forecasting, healthcare, compliance, diagnostic, automation etc. In addition to that, there are problems related to unstructured message, entity mapping problems, attribute mapping problem, and artificial ignorance problem etc.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for creating an instance model. The system comprising a user interface, a memory and a processor in communication with the memory. The user interface provides a plurality of data sources as a first input. The processor further configured to perform the steps of: providing an existing ER model as a second input to the template model generation module; creating a template model using the first input and the second input by the template model generation module; extracting an information from the plurality of data sources using the extraction module; providing the template model, the extracted information and the ER model as input to instance model generation module; creating the instance model by the instance model generation module; and merging the created instance model to one or more existing instance models.

In another aspect the embodiment here provides a method for creating an instance model. Initially, a plurality of data sources is provided as a first input using a user interface to a template model generation module. Also, an existing ER model is provided as a second input to the template model generation module. In the next step, a template model is created using the first input and the second input by the template model generation module. In the next step, an information is extracted from the plurality of data sources using the template model. In the next step, the template model, the extracted information and the ER model are then provided as input to instance model generation module. The instance model is created by the instance model generation module. And finally, the created instance model is then merged with one or more existing instance models.

In another embodiment, a non-transitory computer-readable medium having embodied thereon a computer program for creating an instance model. Initially, a plurality of data sources is provided as a first input using a user interface to a template model generation module. Also, an existing ER model is provided as a second input to the template model generation module. In the next step, a template model is created using the first input and the second input by the template model generation module. In the next step, an information is extracted from the plurality of data sources using the template model. In the next step, the template model, the extracted information and the ER model are then provided as input to instance model generation module. The instance model is created by the instance model generation module. And finally, the created instance model is then merged with one or more existing instance models.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
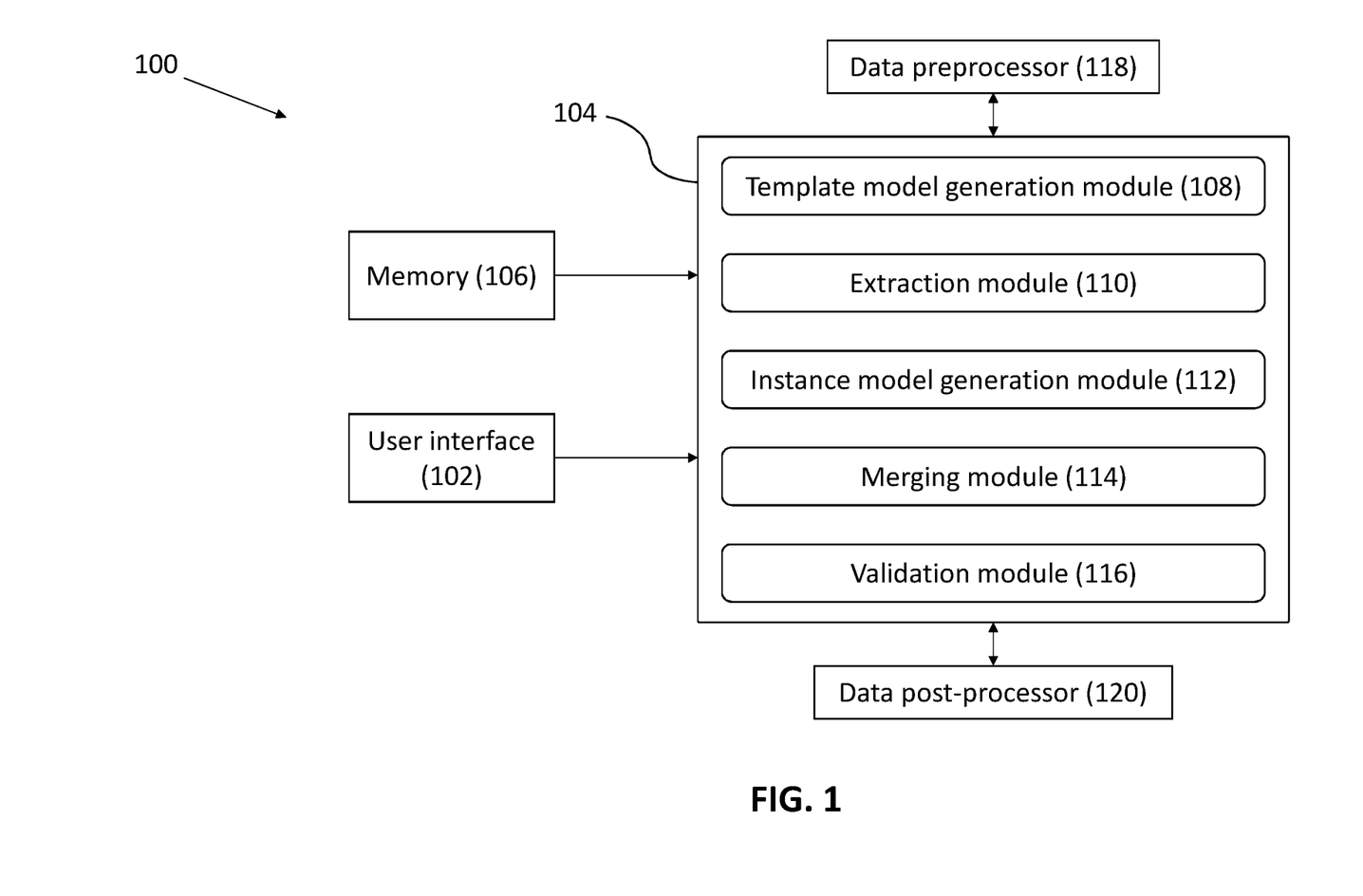
FIG. 1 illustrates a block diagram for creating an instance model in accordance with an embodiment of the present disclosure.

According to an embodiment of the disclosure, a system 100 for creating an instance model is shown in FIG. 1. The system 100 extracts information to fill the domain conceptual model like entity relationship (ER) model and create different instance models. In view of the foregoing, according to an embodiment, the system and method for creating the instance model is for services as software is disclosed. The services may be infrastructure services, business process services, enterprise services, healthcare services and the like.

In the context of present disclosure, the term 'knowledge' and 'information' can be defined as follow: Knowledge: a domain model capturing structural and the functional properties of all domain elements. The knowledge representation may be termed as (domain) ontology or knowledge graph. And the reasoning and inference engine is the processing unit. Information: It is the subset of knowledge (in exact/specific context) used to solve a certain problem And both information extraction as well as information retrieval is performed here.

According to an embodiment of the disclosure, the system 100 comprises a user interface 102, a processor 104 and a memory 106 in communication with the processor 104. The processor 104 configured to execute algorithms stored in the memory 106. According to an embodiment of the disclosure, the processor 104 further includes a plurality of modules for performing various functions. The processor 104 may include a template model generation module 108, an extraction module 110, an instance model generation module 112, a merging module 114 and a validation module 116.

According to an embodiment of the disclosure the user interface 102 is configured to provide inputs to the system 100. The user interface 102 is configured to provide a plurality of data sources as a first input. The user interface 102 can also be configured to provide an existing entity relationship (ER) model as a second input. The user interface 102 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

The first input of the plurality of data sources which is provided to the system 100 can be in various form, structured, unstructured, semi-structured, media, images and the like. The information can be extracted using at least one of natural language processing (NLP) pipeline tools to perform stemming, co-reference resolution, chunk parsing and part of speech tagging. In another example, the image processing tools may be used to perform OCR and similar tasks. In yet another example, scripting tools like groovy, Perl, and so on, audio/video processing tools, text to speech, and the like can also be used.

Figure 3:
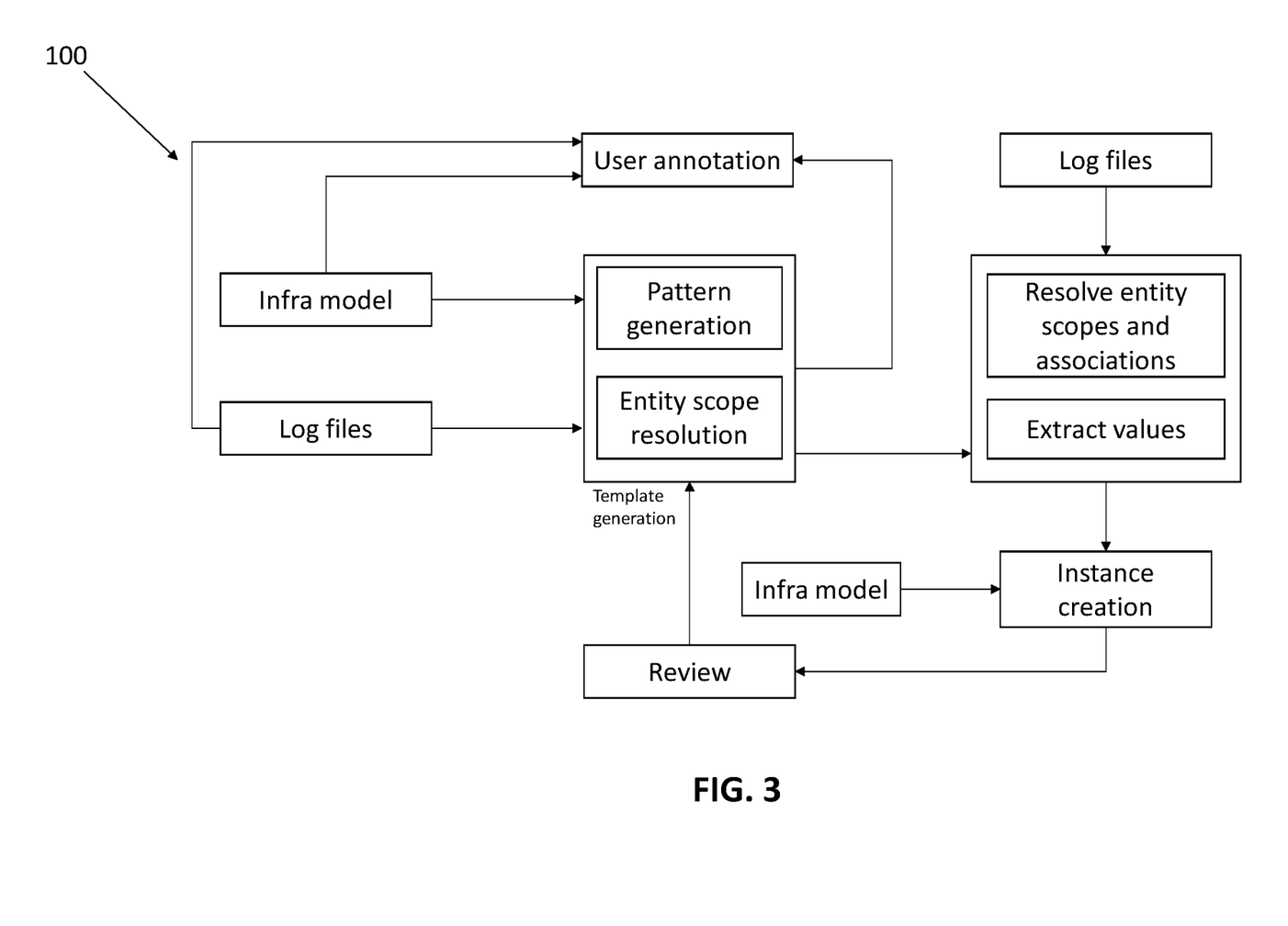
FIG. 3 shows a block diagram of data extraction framework in accordance with an embodiment of the present disclosure.

According to an embodiment of the disclosure, the processor 104 includes the template model generation module 108 as shown in FIG. 1 and in the data extraction framework of FIG. 3. The data extraction framework extracts the relevant information from various structured input sources such as log files, pdf files, invoices, etc. using annotations. The first input and the second input are provided to the template model generation module 108. The template model generation module 108 has pattern generation and entity scope resolution. Extraction pattern is automatically generated from user marking and annotations. The template model generation module 108 generates a template model. The output of the template model generation module 108 is given to the extraction module 110. The extraction module 110 resolves entity scopes and associations and extracts information from the plurality of data sources.

According to another embodiment of the disclosure, the template model can also be generated automatically. The automated method first finds initial set of potential mappings with context and exact segment matching and semantic level mappings using lexical and concept level matching. The help inherent structure can also be taken while finding the template elements. For example, consider the tabular form data where top row contains ER elements such as classes and attributes, whereas data rows contains existing instance model elements or entries satisfying rules or patterns attached with ER elements about their instances. The exact matching means high confidence and semantic or context-concept level matching means relatively lower confidence in the findings. The secondary type matching also include data types defined in domain ontology and regular expression matching, which applied directly on data or after some post processing like additions of part-of-speech tags to the words if it's on text form data or co-reference resolutions like natural language processing. Every potential mapping's confidence is computed as weighted score of individual scores. The highest confidence mappings are established first and other mappings established by doing connectivity analysis or inferencing on ontology.

This method involves finding the ER elements in the plurality of data sources and predicting the location of the ER element values by localization (searching nearby locations), pattern matching (searching for known patterns of the ER element values). For example, if date is being searched available date formats can be used to search data that represents a date. Similarly and IP address can be searched using a pattern \b((25[0-5]|2|[0-4][0-9]|[01]?[0-9][0-9]?)(\.|$)){4}\b and so on, and past knowledge application. In another example, from past templates it might be a common knowledge that credit card number will be always a 16 digit number. Such patterns can be automatically learned to aid automatic template model generation. Also location of a plausible data presence can also be utilized as learnings from earlier template models. In yet another example, the presence of 'date' in the data source denotes that the date will be present either to the right of it or below it. Such various analysis can be done and knowledge extracted for increasing the efficiency and quality of the template model generation.

Figure 4:
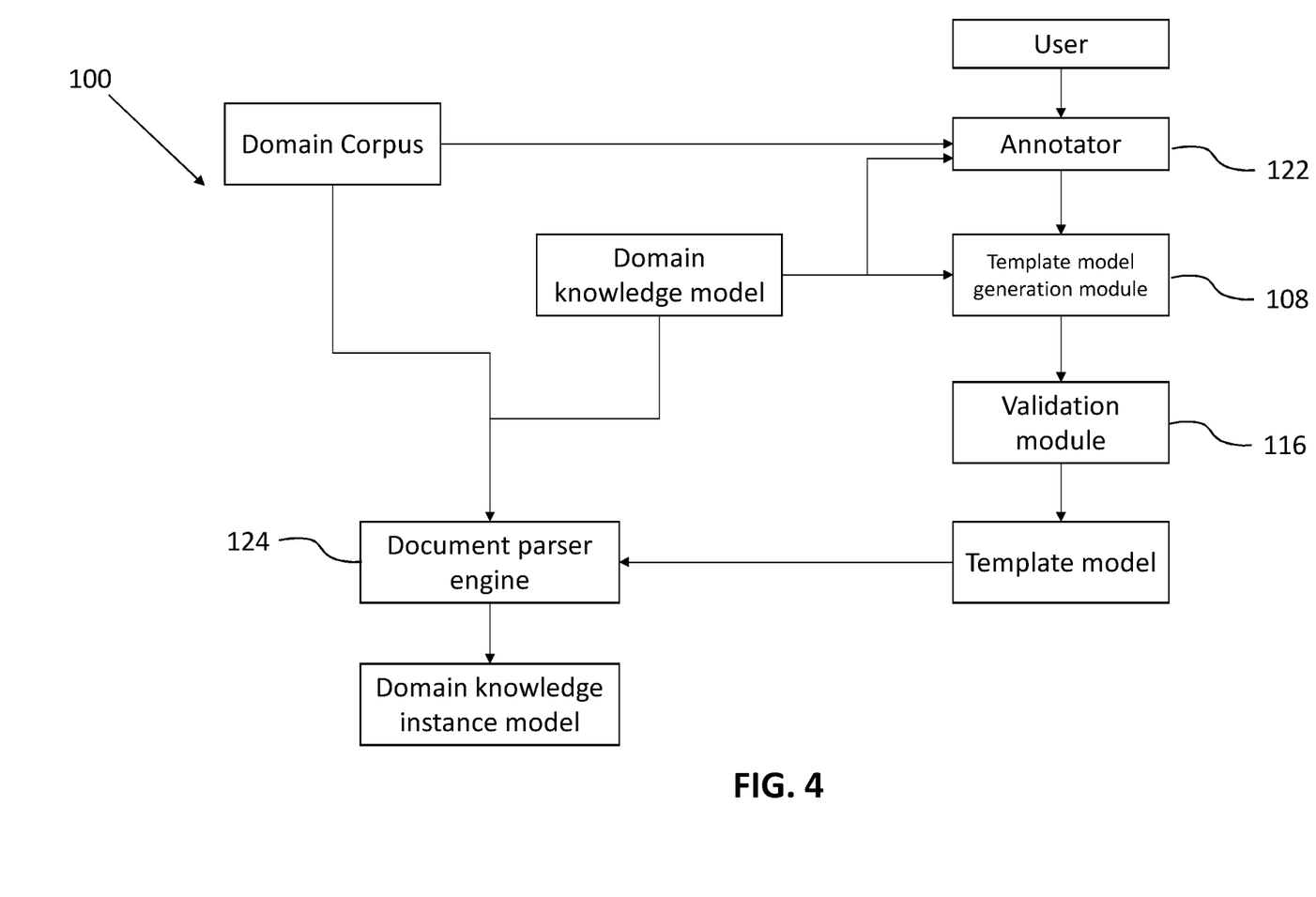
FIG. 4 shows a schematic architecture of generic extraction framework for creating the instance model in accordance with an embodiment of the present disclosure.

According to an embodiment of the disclosure, the processor 104 also includes the instance model generation module 112, the merging module 114 and the validation module 116. The template model, the extracted information from the extraction module 110 and the existing ER model is given to the instance model generation module 112 as shown in FIG. 4. The template model 110 indicates 'where' part of information extraction, from where the user wants to extract the information. The existing ER model indicates 'what' part of information extraction, exactly what data the user wants to extract, the same is available (reference) in the template model and the template model indicates 'how' part of the information extraction, i.e. how the information is to be extracted. The instance model generation module 112 generates the instance model as output. The merging module 114 then merges the created instance model with the one or more existing instance models. For example, if a medical data (clinical trials, medical report, etc.) is converted to an instance model then the same will be merged with the existing instance model of the patient if the patient already exists in the existing instance models.

The instance model then can be validated using the validation module 116. Based on the validation, the review information or feedback can be given back to the template model generation module for it to adapt. The meaning of adapt here can be explained as follows: Template model generation is performed initially using the plurality of data sources, the existing ER model and the knowledge. An additional data which needs to be extracted from the plurality of data sources is then annotated. This template model is then shown to the user in form of annotations on the data source. The user can change/delete/add annotations as appropriate. The annotated additional data is then mapped with the ER model elements. These annotations are then used along with the plurality of data sources and the ER model to generate a new template model. Also the modifications made by user are used as feedback to enhance the knowledge which is used for further automated generations of the new template model.

According to an embodiment of the disclosure, there are two parts of the method the first part is authoring of the template model to create the instance model and the second part is the further designing of the template model depending on the type of the plurality of data sources. In the first part as explained above, authoring of template model is done by the user and in this process extracting the information, converting to the instance model, validation by the user for feedback and fixing the template model is achieved.

Further in the second part, once the template model is defined and agreed, the plurality of data sources can be monitored online and the conversion to instance model can be triggered on data presence. During this process an appropriate template is picked up which best matches to the data source. For this in the template data source specific images, texts, or any other identifiable data can be marked as key for a template to match. In absence of any such key markings a best template can also be configured to be chosen based on the content and largest match of the templates available. For example, a bank name, a bank logo along with the name of form can be looked for matching by specifying these as key markings. A template with all three will be best match and will be used for the instance model generation.

The existing ER model will change as domain changes. Each domain consists of specific set of entities and attributes. Telecom domain will have entities like call summary, call items and attributes like date-time, calls/sec etc. Whereas pharmaceutical domain will contain entities like, drug, patient-details and it will have attributes like dosage, price, patient DOB, initials, etc. Whereas the template model will be different for different data sources. Data source will be defined by what information it contains, in what structure, in what format (pdf, image, text) and source of the information (customer, department, producer of information, etc.).

According to an embodiment of the disclosure, the processor 104 further comprises a data preprocessor 118 and a data postprocessor 120. The data preprocessor 118 is configured to pre-process/clean the input data which is provided for the data extraction. Similarly, the data postprocessor 120 is configured to process the extracted data. The content of the data preprocessor 118 and the data post processor 120 can be customized depending on the source of data. For example, account opening form of HDFC bank will need a different processing compared to account opening form of Baroda bank. In another example, if a user gets an IP address, but output is expected to be the blueprinted node ID along with the IP address, then the IP address needs to be translated to some other form, which is the part of data post-processing.

The plurality of data sources need to be processed using the data preprocessor 118 before providing it to information extraction. Depending on the type of the use case and the type of the plurality of data source, the processing steps change. For position or marker based (structured) information extraction, a simple static pattern based approach is sufficient. In communication based mode, the discourse is open for semantic interpretation and requires Natural Language Processing, hence position or marker based approach will not be sufficient. For NLP processing, there is a need of all relevant NLP ontologies like Lexical DB, Concept-Net, WordNet, Domain Lexicon, Verb Net, etc. Also to make the processing faster and smarter for given domain, ontology of knowledge elements can also be created over the set of given entity, attribute, actions within the domain. The knowledge elements are open to link (or contain) elements from NLP ontologies. That way it is a pre-processing of knowledge (data sources) to increase the processing efficiency and accuracy. Over the time, the learning (continual improvement) will make this domain ontology more and more complete and correct. Language structures can also be learnt over the period to avoid processing in some cases and to minimize processing in others.

In case of simple information extraction (structured data), only ER model and simple static patterns are sufficient. Once a template is provided, the template gets applied on input data and the instance model gets generated. Also there could be need of time series data extraction, targeting the time factor over the infrastructure and their properties. The time based blueprint is useful for time based data analytics like predicting future events and setting alarms etc.

According to an embodiment of the disclosure, the system 100 provides an information extraction and modeling framework from wide spectrum of document types such as PDF, Text, HTML, LOG, CSV, Audio/Video files, DOCX and the likes. It should be appreciated that the information can also be extracted from SMS, email, tweet etc. data formats for which natural language processing would be essential to make sense out of the data. The example of data may include Application logs, Database logs, Network logs, Configuration files, Performance data (iostat, vmstat, ps, etc.), invoices, cioms forms, rave forms or anything else that has a time component. It should also be appreciated that the information can also be extracted from the scanned documents for which OCR is must for extracting text. In an example, automation and compliance is used for explanation and logs as example of data under extraction.

According to an embodiment of the disclosure, the knowledge model could be an entity relationship (ER) model and blueprint model. Entity Relationship model is domain model representation of entities and association between them. Association can be 'is-a', 'has-a' etc. Associations could also be between entity-to-entity and attribute-to-attribute. Each entity represents resource and technology service in service as a software computing model. Here entities can have attributes without having any attribute value. Meta level association is defined between entities. Blueprint model is an instance of the ER model. Entity can have more than one instance, for example user, file, file system can have multiple instance. Entity Instances can have association with other entity instances.

According to another embodiment of the disclosure, a schematic architecture of generic extraction framework for creating the instance model is shown in FIG. 4. In this case, domain corpus such as logs, manuals, forms, web site links are taken as the input. In addition to that information provided by the user in the form of annotation or validation and a domain knowledge is also provided as the input. These three inputs are provided to an annotator 122. If the information may not be auto detected then user will give information or vice-versa or it could be combination of both. The output from the annotator 122 is provided to the template model generation module 108. The annotation is not limited to text data. User can annotate images, logos from the image input. To be more generic, user can also annotate in audio, video data as well. The annotator 122 has the capability for auto generating the annotation by analyzing its inputs. The information from the template model generation module 108 is reviewed and validated using the validation module 116, which results in the generation of the template model.

According to an embodiment of the disclosure, the template model can also be provided to a document parser engine 124. The document parser engine 124 also receives input from the domain knowledge model and the domain corpus. This example is specific to text/html/pdf form data. It could be even excel, xml etc. that is in machine readable form. And finally the document parser engine generates the domain knowledge instance model as the output.

This system or method is not limited to extract information from log files using ER model and annotations, other data sources can also be used. This can useful for different types of files including log, text, pdf, html etc. and this can also be useful if the structures and formats of data are different. The system is also applicable for image search by applying visual search. The main component of the system are pattern learning or pattern builder and pattern execution. The architecture of system is generic enough to easily build plugins for new data format. It also supports partial matching and aggregation of pattern from historical evidence and existing patterns. Framework supports Image Processing (OCR), script based extractions, and plain string matching, regex matching, and NLP feature matching to extract key value pair from data sources. It also supports time search data extraction in real time.

According to an embodiment of the disclosure, the system can have scope associations as follows: i) Containment or Has or ii) Scope to Scope. The scope can have multiple child scopes. Further in another example, the scope can have only single element. The element is reference to a component. The element could be anything which is specified in the ER model for example, user.name, company id etc.

According to an embodiment of the disclosure, the system 100 can also involve chaining, i.e., part of transformation. In chaining, more than one transformation is performed, the input remains same but output keep on changing. The user may have more than one templates. The first step is to identify which is the next template to apply. Chaining is used when there is a need different template for different vendors.

According to an embodiment of the disclosure, the system 100 can also store the created instance model.

Figure 2A:
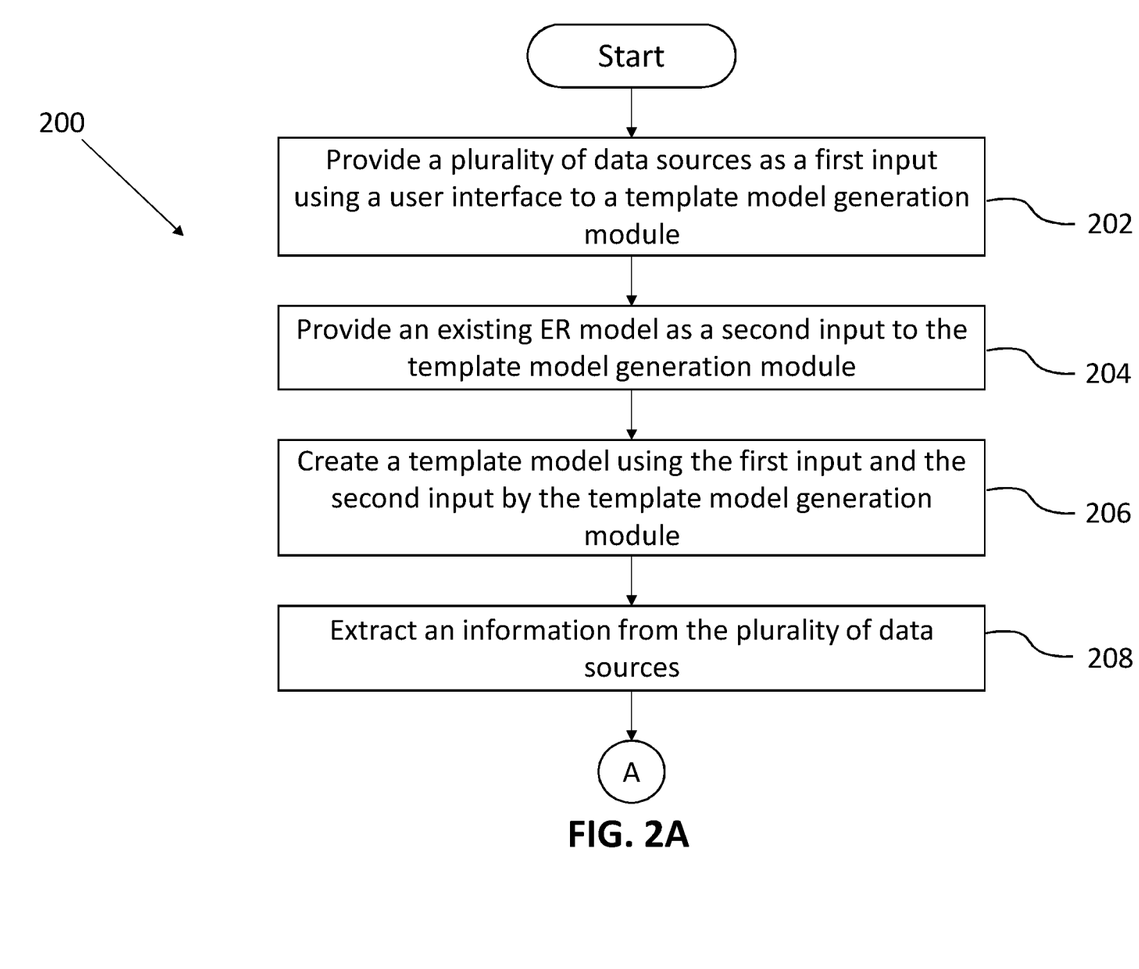
FIG. 2A-2B is a flowchart illustrating the steps involved in creating the instance model in accordance with an embodiment of the present disclosure.
Figure 2B:
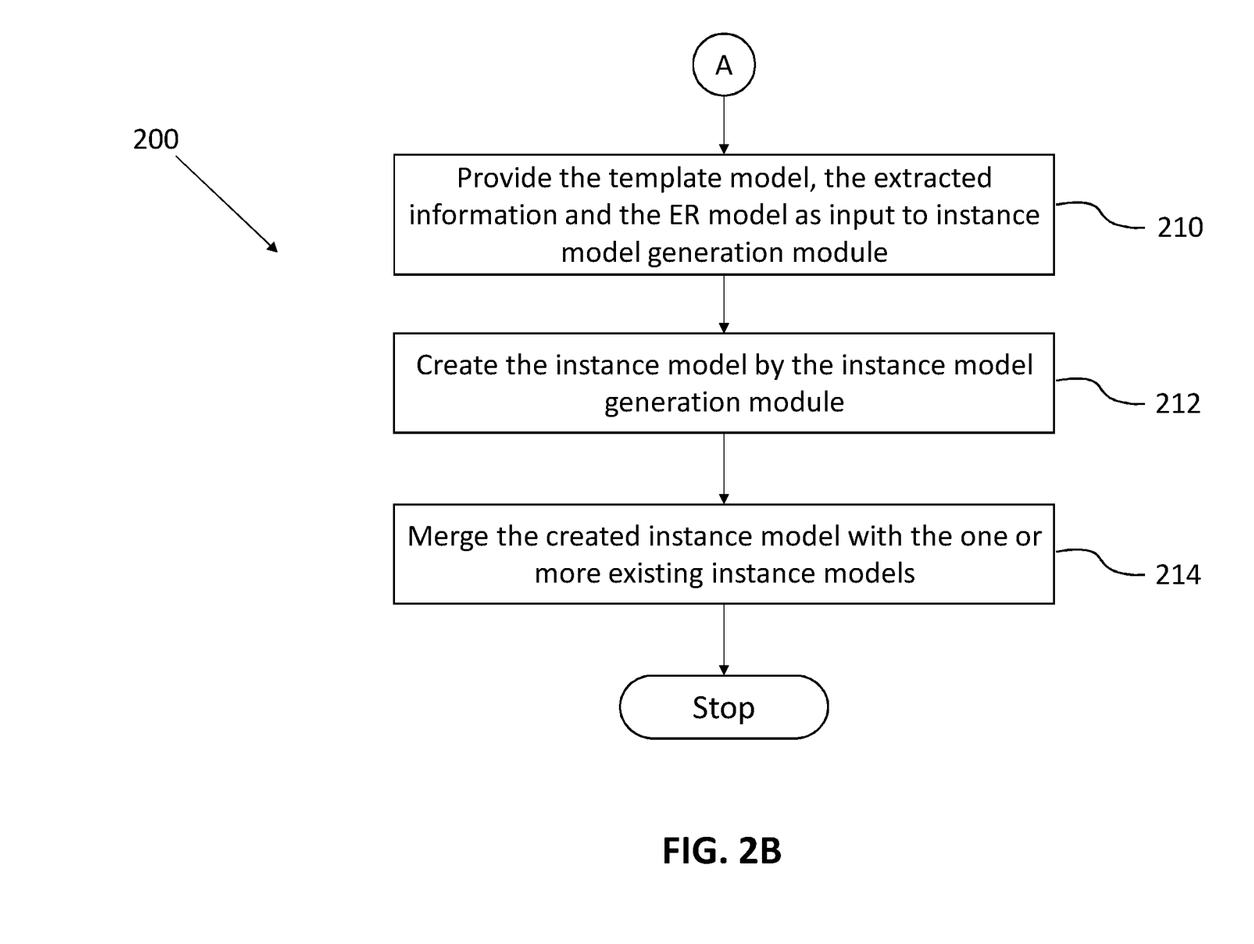

In operation, a flowchart 200 illustrating the steps involved for creating the instance model is shown in FIG. 2A-2B. Initially at step 202, the plurality of data sources is provided as the first input using the user interface 102 to the template model generation module 108. In the next step, 204 the existing ER model are provided as the second input to the template model generation module 108. The second input is also provided using the user interface 102. In the ER model, the entities can have attributes without having any attribute value. At step 206, the template model is created using the first input and the second input by the template model generation module 108. The created template model can have scope and extraction pattern for metadata. In the next step 208, the information is extracted from the plurality of data sources using the extraction module 110. There can be different types of files including log, text, pdf, and html etc. from which the information can be extracted. The same ER model applying on different sources of data, mixing of digital model is also possible if the structures and formats of data is different.

In the next step 210, the template model, the extracted information and the ER model are provided as input to the instance model generation module 112. At step 212, the instance model is created by the instance model generation module 112. And finally at step 214, the created instance model is merged with the one or more existing instance models. The instance model may also be referred as the blueprint model. Blueprint model is instance model of the ER model. Entity can have more than one instance, for example user, file, file system can have multiple instance. Entity Instances can have association with other entity instances.

Figure 5:
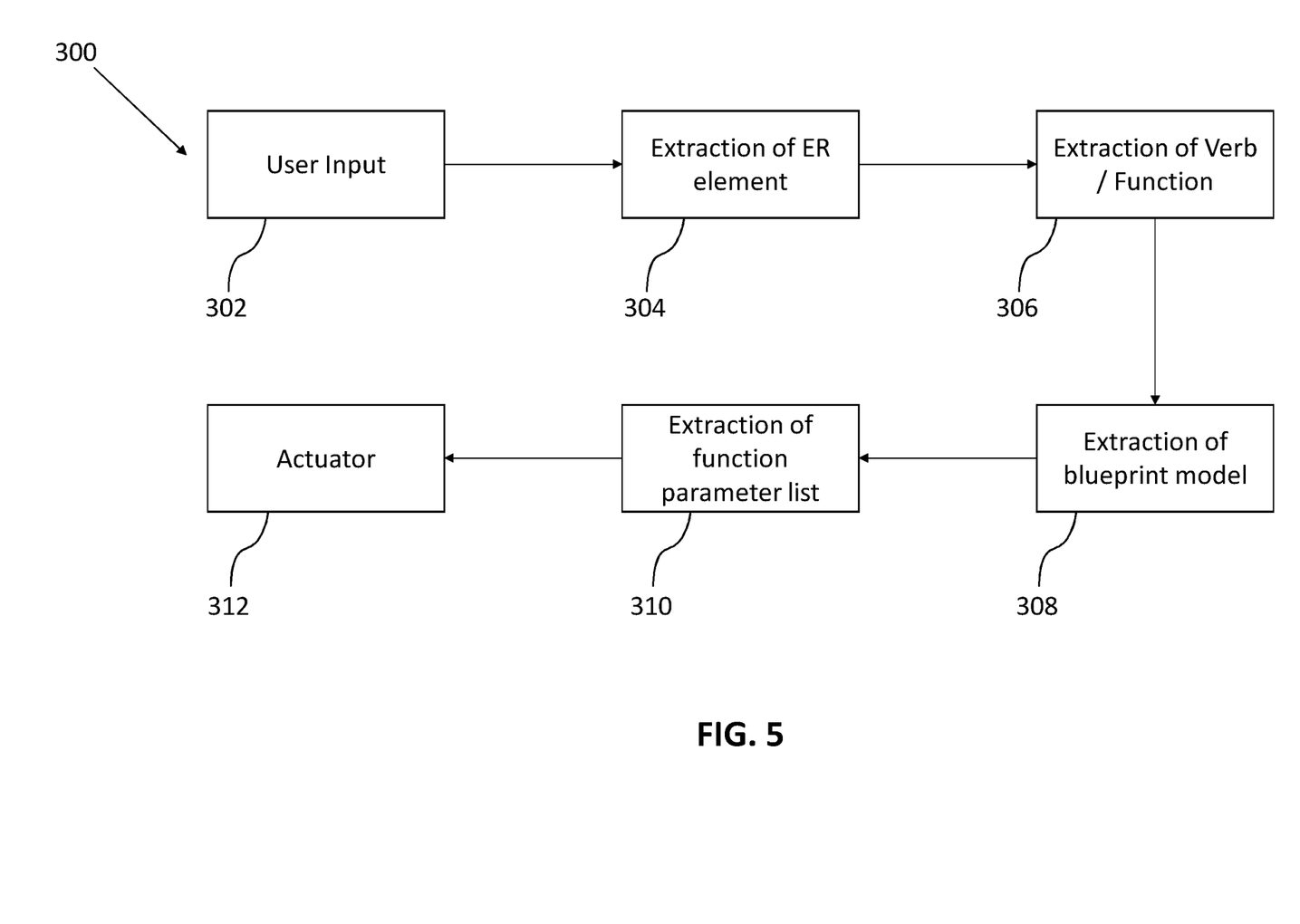
FIG. 5 shows a schematic representation of the conversational interface for processing the input data in case the data is in unstructured format in accordance with an embodiment of the present disclosure.

According to an embodiment of the disclosure, FIG. 5 shows a schematic representation of a conversational interface 300 for processing the input data in case the data is in unstructured format. There could be various scenarios when the input data is day to day conversations rather than high-end complicated queries or forms. Initially at 302, the user input in the form of input string is provided. The user input could be in any form such as any question or any statement. The input string is expected to contain enough information to perform the required operation. The information provided by the user contains ER element, verb, blueprint node, and function parameters information. At 304, the ER elements from the input string is extracted. The user input string is compared with the existing ER model to know which ER element the user is referring. At 306, verb and functions are extracted from the input string. Verbs on the leaf node of list of ER Element will be searched in the user input in order to know which operation the user wishes to perform. At 308, the blueprint model is extracted. The key attribute of each element in ER are extracted, followed by the finding of the value of each key attribute and storing it in a map. And, if key value map is present in blueprint model, then corresponding node is selected. At 310, the function parameter list is extracted. Value for function parameters will be searched in the user input string and stored in map. Only if required key value map is present, then the function will be executed. And finally at 312, If the required function contains all the required parameters, then the function will be executed as per requested by the user. The conversational interface can also work if there are 2 or more sentences represent the same meaning but have different usage of words. The work of conversational interface is to find out the similarity between sentences and take out the meaning accordingly.

According to another embodiment of the disclosure, the system 100 can also be explain with the help of the following example:

Table, Line and Map are extended classes (meta-meta models) defined as an identifier to understand there semantic meanings. It was aimed to specify each of these extended classes in terms of meta-meta model without having any specific meaning associated with them.

For example: Table is a container scope, semantically which contains Scope Header and Scope Rows and key-value mapping between them and Scope Header is set of scopes heading. Meta-meta scope model is only semantic meaning and structural model which doesn't have any underneath information about the domain or ER model. The meta scope model have other information like key-key mapping, key-value mapping related to the ER model. Whereas the Instance model is actual scope instance which contains values. Scope merger was specified which helps to identify the merging between scopes. Scope relation was also specified to reflect an association between scopes e.g. User U1 is the owner of File F1. Entity-to-entity relations also could have its own attributes like entity. hasPermission (user-to-file) relation could have permission as attribute (read, write etc.)

The meta-meta model will be only structure and not bounded with any data format or not restricted to any specific input data, that means its input data format agnostic. The input data could be text format data or an image format data. The meta-model has key-value and value-value mapping which use the ER model information. So meta-model instance were obtained when the meta-meta model is bounded with ER and the template model. If only the structure part is looked from meta-model, it's still input data agnostic. The Pattern (start, end etc.) and the attributeMapping from meta-model are input data format dependent. Those parts were separated from meta-model and put under Formatter group. On Instance model ETL was performed to generate blueprint model. 1. (Extract) how to extract data from input, 2. (Transform) how to process input data and transform to blueprint model attribute values 3. (Part of transform) (Load) how to build entities and relationships among those, to create blueprint model, these are 3 ETL steps. The first step (Extract) is only input data format dependent. The second step (Transform) is input data format and ER data format dependent. The third step (Load) is only ER model dependent.

Meta-Meta Model Examples

1.

TABLE

```
<Scope name="Table">
  <Scope name="header">
     (<Scope name="heading"/><Scope name="separator"/>)*
     </Scope>
  <Scope name="separator"/>
     (<Scope name="row">
        (<Scope name="cell"/><Scope name="separator"/>)*
     </Scope>
  <Scope name="separator"/>)*
  <KeyValueScopeMapping KeyScope="header.heading" valueScope=
  "row.cell"/>
</Scope>
```

Here <Scope name="cell" ref="heading"/> is the meta-meta level mapping between value (cell) and key (heading), and mostly key will be constant for underneath domain (or specific document type/version.)

More important point here is the positional/index based mapping. As it's marked *, the heading scope will repeat. Similarly cell scope will repeat. There is heading scope ref into the cell scope. Hence according to the meta level schema/syntax, the mapping scheme/rule/pattern will be carried forward with the heading and cell scope's repetitions, and the repetition order will be inherited for mapping. Mathematically this means cell[i] has ref=heading[i] entry. Also in the following structure:

```
(<Scope name="row">
   (<Scope name="cell" ref="heading"/><Scope name="separator"/>)*
   </Scope>)*
```

*at the end for the row scope, means haveMultiplicity flag for row scope set to be true.

Whereas for—

```
(<Scope name="cell" ref="heading"/><Scope
   name="separator"/>)*
```

* at the end of the group of 2 scopes, another mechanism was needed to mention grouping of scopes to be repeated in the same order (scope was a structure for grouping and repetition purpose only but with many more additional members.) This list is complete idReferences for row scope, another variable innerGroupRepeat can be provided to allow repetition of idReferences group within the row scope.

2. Map

```
<Scope name="map">
   (<Scope name="key"/><Scope name="Separator"><Scope name=
   "value"/>
      <Scope name="Separator">)*
   <KeyValueScopeMapping KeyScope="key" valueScope="value"/>
</Scope>
```

3. Line

```
<Scope name="line">
    (<Scope name="word"> <Scope name="separator"/>)*
</Scope>
```

Here ref="infra.attr" assignment will be needed as default value or default ref value assignment option can be given to user via UI. That is because, Line as a meta meta scope will be designed by user via (by making use of) the system provided by us. So if ref uninitialized is kept for word scope, by default it's user's responsibility to provide the mapping at a meta level i.e. for the instance of meta meta level Line scope while generating the domain (ER) dependent template.

ER Model Example:

```
{
    "type": "oracle",
    "identifier": "oracle",
    "attributes":
    [
        {
            "name": "sid"
            "identifier": "Oracle.DF.sid",
            "controllable": true,
            "primary": true
        },
        {
            "name": "name",
            "identifier": "Oracle.DF.name",
            "controllable": true,
            "primary": false
        },
        {
            "name": "DBInstance",
            "identifier": "Oracle.DF.DBInstance",
            "controllable": true,
            "primary": false
        }
    ],
    "associations":
    [
        {
            type": "ContainedIn",
            "target": "DBInstance"
        }
    ]
}
```

Meta Model Examples:

The meta-meta model instance will be meta model, the scopes will be created by applying default logic. But the user can modify the scopes and its properties while defining the meta model. ScopeMeger is for merging the Scopes, that means the InfraEntity from those scopes will instantiate into unified BlueprintEntity and not into distinct BlueprintEntities.

To specify the value-value mapping, ScopeRelation is required which will contain sourceScope and targetScope, both being objects of ScopeMeger, which is container for the list of scope paths. So ideally there should be reference of ScopeMeger object from Scope, unless it's a single attribute entity container scope which not needed ScopeMerger at all. To make it more simple or scalable/implementable, one or many ScopeMerger can be kept for each InfraEntity from the scope branch (InfraEntity of that scope and of all child scopes as well.)

For the blueprint model generation stick to binary relationships between entities, i.e. entity-entity associations, so source and target, generic terminology have been used to specify those entities. But to become more generic from modeling point of view, the ScopeRelation will contain List<ScopeMerger> as then the relationship between those entities. Generally for relationships, order is important, but there could exist few entity order agnostic relationships and even few set/group/category like relationships as well where even the count of entities (relationship arity) is even not fixed.

1. TABLE

```
<Scope name="Table" pattern="start,end">
    ( <HashMap key="header.heading" value="Entity.name.Attribute.name">
        </HashMap>)*
    <Scope name="header">
<Scope name="heading1"/><Scope name="separator"/> <Scope name="heading2"/><Scope name="separator"/> <Scope name="heading3"/><Scope name="separator"/>
        </Scope>
    <Scope name="separator"/>
    (<Scope name="row">
        <Scope name="cell1"/><Scope name="separator"/><Scope name="cell2"/><Scope name="separator"/><Scope name="cell3"/><Scope name="separator"/>
        </Scope>
    <Scope name="separator"/>)*
    <KeyValueScopeMapping KeyScope="header.heading1" valueScope="row.cell1"/>
    <KeyValueScopeMapping KeyScope="header.heading2" valueScope="row.cell2"/>
    <KeyValueScopeMapping KeyScope="header.heading3" valueScope="row.cell3"/>
</Scope>
```

Here repetition of row scope will not be there in meta model, rather it is the repetition of the scope group and hence similar to meta-meta Table scope example, the innerGroupRepeat variable will allow the repetition of the idReferences group within the row scope. To incorporate the "cell[i] has ref=heading[i] entry" mapping rule/logic, similar to heading scope instances, the cell scope instances will be created along with the ref entry updates. But the row scope repetition is not part of the meta scope, rather this row scope instances will be created as ScopeInstance at run time after getting row scope multiple matches (count can be resolved only at run time.)

```
( <HashMap>
    <key="DB Name" value="Entity.oracle.Attribute.name">
    <key="DB Id" value="Entity.oracle.Attribute.sid">
    <key="Instance" value="Entity.oracle.Attribute.DBInstance">
  </HashMap>)*
```

This is an example of the attributeMapping for above stated Scope.

2. Map

The template will be applied on the input log file, else the user will annotate the scopes manually and it will look like as follows (It's Map meta model applied on a file via User Interface)

The Map meta will look as follows:

```
<Scope name="map" pattern="start,end">
    ( <HashMap key="key" value="Entity.name.Attribute.name">
    </HashMap>)*
  <Scope name="key1"/><Scope name="Separator"><Scope name="value1"/>
  <Scope name="Separator">
  <Scope name="key2"/><Scope name="Separator"><Scope name="value2"/>
  <Scope name="Separator">
  <Scope name="key3"/><Scope name="Separator"><Scope name=
```

-continued

```
"value3"/>
  <Scope name="Separator">
    <KeyValueScopeMapping KeyScope="key1" valueScope="value1"/>
    <KeyValueScopeMapping KeyScope="key2" valueScope="value2"/>
    <KeyValueScopeMapping KeyScope="key3" valueScope="value3"/>
  </Scope>
```

Similar to the meta level Table scope logic explained above for repeating the header and cell scope at meta level, same logic will be applicable here in the meta level Map scope for repeating the key and value scope (the innerGroupRepeat variable within map1 scope will allow the repetition.)

3. Line

```
<Scope name="line" pattern="start,end">
    (<HashMap key="word" value="Entity.name.Attribute.name">
    </HashMap>)*
    (<Scope name="word1"> <Scope name="separator"/>)
    (<Scope name="word2"> <Scope name="separator"/>)?
    (<Scope name="word3"> <Scope name="separator"/>)?
  </Scope>
```

Here line is a special case where isMandatory field also is very useful at word scope level. For those Scopes where isMandatory=false, the '?' regular expression will appear in the extraction pattern.

Instance Model Example:

No need of start, end repetition of information. Pattern is a template related (input data's pattern specific) information, which is not mandatory and also not useful anymore at the instance level Similarly, ScopeMerger will contain scope paths which are not needed to repeat along with each ScopeInstance. Rather ScopeMerger and ScopeRelation are meta information for the ScopeInstance.

1.

TABLE

```
WORKLOAD REPOSITORY report for
            DB Name     DB Id Instance
        ORCL 1411676436 orcl
        ORCL1      14116764361 orcl1
<ScopeInstance scopeReference="Table1" extractedData="WORKLOAD REPOSITORY report
for\nDB Name\tDB Id\tInstance\nORCL\t1411676436\torcl\nORCL1\t14116764361\torcl1" >
    ( <HashMap>
            <key="Entity.oracle.Attribute name" value="ORCL ">
            <key="Entity.oracle.Attribute.sid" value="1411676436 ">
            <key="Entity.oracle.Attribute.DBInstance" value="orcl ">
    </HashMap>)*
            <ScopeInstance scopeReference="header" extractedData=" DB Name\tDB
Id\tInstance>
<ScopeInstance scopeReference="heading1" extractedData=" DB Name"/>
    <ScopeInstance scopeReference="Separator" extractedData="\t"/>
<ScopeInstance scopeReference="heading2" extractedData=" DB Id"/>
    <ScopeInstance scopeReference="Separator" extractedData="\t"/>
<ScopeInstance scopeReference="heading3" extractedData=" Instance"/>
    <ScopeInstance scopeReference="Separator" extractedData="\t"/>
    </ScopeInstance>
    <ScopeInstance scopeReference="Separator" extractedData="\n"/>
        <ScopeInstance scopeReference="row" extractedData="ORCL\t1411676436\torcl" >
        <ScopeInstance scopeReference="cell1" extractedData="ORCL" />
            <ScopeInstance scopeReference="Separator" extractedData="\t"/>
        <ScopeInstance scopeReference="cell2" extractedData="1411676436" />
            <ScopeInstance scopeReference="Separator" extractedData="\t"/>
        <ScopeInstance scopeReference="cell3" extractedData="orcl" />
            <ScopeInstance scopeReference="Separator" extractedData="\t"/>
        </ScopeInstance>
    <ScopeInstance scopeReference="Separator" extractedData="\n"/>
        <ScopeInstance scopeReference="row" extractedData="ORCL1\t14116764361\torcl1" >
```

TABLE-continued

```
    <ScopeInstance scopeReference="cell1" extractedData="ORCL1" />
        <ScopeInstance scopeReference="Separator" extractedData="\t"/>
    <ScopeInstance scopeReference="cell2" extractedData="14116764361" />
        <ScopeInstance scopeReference="Separator" extractedData="\t"/>
    <ScopeInstance scopeReference="cell3" extractedData="orcl1" />
        <ScopeInstance scopeReference="Separator" extractedData="\t"/>
    </ScopeInstance>
  <ScopeInstance scopeReference="Separator" extractedData="\n"/>
</ScopeInstance>
```

2. Map:

```
WORKLOAD REPOSITORY report for
DB Name : ORCL
DB Id : 1411676436
Instance: orcl
  <ScopeInstance extractedData="WORKLOAD REPOSITORY
  report for \n DB Name : ORCL \n
DB Id : 1411676436 \n Instance: orcl" >
    ( <HashMap>
       <key="Entity.oracle.Attribute name" value="ORCL ">
       <key="Entity.oracle.Attribute.sid" value=" 1411676436 ">
       <key="Entity.oracle.Attribute.DBInstance" value="orcl ">
     </HashMap>)*
       <ScopeInstance extractedData=" DB Name"/>
<ScopeInstance scopeReference="Separator" extractedData=":"/>
<ScopeInstance extractedData="ORCL" />
  <ScopeInstance scopeReference="Separator" extractedData="\n"/>
  <ScopeInstance extractedData="DB Id"/>
     <ScopeInstance scopeReference="Separator" extractedData=":"/>
<ScopeInstance extractedData="1411676436" />
     <ScopeInstance scopeReference="Separator" extractedData="\n"/>
  <ScopeInstance extractedData=" Instance"/>
<ScopeInstance scopeReference="Separator" extractedData=":"/>
<ScopeInstance extractedData="orcl" />
  <ScopeInstance scopeReference="Separator" extractedData="\n"/>
</ScopeInstance>
```

3. Line:

```
     ORCL   1411676436    orcl
<ScopeInstance scopeReference="line" extractedData="ORCL\
t1411676436\torcl" >
  ( <HashMap>
      <key="Entity.oracle.Attribute.name" value="ORCL ">
      <key="Entity.oracle.Attribute.sid" value="1411676436 ">
      <key="Entity.oracle.Attribute.DBInstance" value="orcl ">
    </HashMap>)*
  <ScopeInstance scopeReference="word1" extractedData="ORCL" />
  <ScopeInstance scopeReference="Separator" extractedData="\t"/>
  <ScopeInstance scopeReference="word2" extractedData=
  "1411676436" />
      <ScopeInstance scopeReference="Separator" extractedData="\t"/>
  <ScopeInstance scopeReference="word3" extractedData="orcl" />
      <ScopeInstance scopeReference="Separator" extractedData="\t"/>
</ScopeInstance>
```

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provides a system and method for generating an instance model.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for creating an instance model, the method comprising a processor implemented steps of:
   providing a plurality of data sources as a first input using a user interface to a template model generation module;
   providing an existing entity relationship (ER) model as a second input to the template model generation module;
   creating a template model using the first input and the second input by the template model generation module;
   extracting an information from the plurality of data sources;
   providing the template model, the extracted information and the ER model as input to instance model generation module;
   creating the instance model by the instance model generation module; and
   merging the created instance model to one or more existing instance models.

2. The method of claim 1 further comprising the step of validating the created instance model.

3. The method of claim 1 further comprising the step of designing the template model based on the type of plurality of data sources as follows:
   marking an identifiable data as a key in the plurality of data sources for matching;
   annotating an additional data to be extracted from the plurality of data sources;
   mapping the annotated additional data with the ER model elements;
   changing the existing generated or specified annotations; and
   generating a new template model by using the annotations and user feedback after validation.

4. The method of claim 1, wherein the information is at least one of domain entities, association between entities, attribute of entities, attributes of association between entities or associated verbs with each entity, attribute and association.

5. The method of claim 1 further comprising the step of preprocessing the plurality of data sources using a data preprocessor.

6. The method of claim 1 further comprising the step of post-processing the extracted information from the plurality of data sources using a data postprocessor.

7. The method of claim 1, wherein the plurality of data sources comprises structured data.

8. The method of claim 1, wherein the plurality of data sources comprises documents of different formats, layouts and structures.

9. The method of claim 1, wherein the plurality of data sources comprises unstructured data and semi structured data.

10. The method of claim 1 further comprising the step of pattern learning, pattern building and execution to extract the information from the plurality of data sources.

11. The method of claim 1 further comprising the step of auto completing the missing information from the earlier context/conversations.

12. The method of claim 1 further comprising the step of auto-populating the template model.

13. A system for creating an instance model, the system comprising:
   a user interface for providing a plurality of data sources as a first input;
   a memory;
   a processor in communication with the memory, the processor further configured to perform the steps of:
      providing an existing ER model as a second input to the template model generation module;
      creating a template model using the first input and the second input by the template model generation module;
      extracting an information from the plurality of data sources using an extraction module;
      providing the template model, the extracted information and the ER model as input to an instance model generation module;
      creating the instance model by the instance model generation module; and
      merging the created instance model to one or more existing instance models.

14. The system of claim 13 further comprising a validation module for validating the created instance model.

15. A non-transitory computer-readable medium having embodied thereon a computer program for creating an instance model, the method comprising a processor implemented steps of:
   providing a plurality of data sources as a first input using a user interface to a template model generation module;
   providing an existing entity relationship (ER) model as a second input to the template model generation module;
   creating a template model using the first input and the second input by the template model generation module;
   extracting an information from the plurality of data sources;

providing the template model, the extracted information and the ER model as input to instance model generation module;

creating the instance model by the instance model generation module; and merging the created instance model to one or more existing instance models.

\* \* \* \* \*